United States Patent
Lin et al.

(10) Patent No.: US 11,132,790 B2
(45) Date of Patent: Sep. 28, 2021

(54) WAFER MAP IDENTIFICATION METHOD AND COMPUTER-READABLE RECORDING MEDIUM

(71) Applicant: Powerchip Semiconductor Manufacturing Corporation, Hsinchu (TW)

(72) Inventors: Chiu-Chieh Lin, Hsinchu (TW); Ching-Ly Yueh, Hsinchu (TW)

(73) Assignee: Powerchip Semiconductor Manufacturing Corporation, Hsinchu (TW)

(*) Notice: Subject to any disclaimer, the term of this patent is extended or adjusted under 35 U.S.C. 154(b) by 60 days.

(21) Appl. No.: 16/721,924

(22) Filed: Dec. 20, 2019

(65) Prior Publication Data
US 2021/0166362 A1 Jun. 3, 2021

(30) Foreign Application Priority Data
Nov. 29, 2019 (TW) ................................. 108143530

(51) Int. Cl.
*G06T 7/00* (2017.01)

(52) U.S. Cl.
CPC .... *G06T 7/001* (2013.01); *G06T 2207/20081* (2013.01); *G06T 2207/20084* (2013.01); *G06T 2207/30148* (2013.01)

(58) Field of Classification Search
CPC .......... G06T 7/001; G06T 2207/30148; G06T 2207/20081; G06T 2207/20084
See application file for complete search history.

(56) References Cited

U.S. PATENT DOCUMENTS

2007/0288219 A1* 12/2007 Zafar .................... G06T 7/0008
 703/14
2017/0178980 A1 6/2017 Owen et al.
(Continued)

FOREIGN PATENT DOCUMENTS

WO 2017120370 7/2017
WO WO2017120370 A1 * 7/2017
(Continued)

OTHER PUBLICATIONS

Shao-Chung Hsu, et al., "Hybrid data mining approach for pattern extraction from wafer bin map to improve yield in semiconductor manufacturing", Int. J. Production Economics, May 2007, pp. 88-103.
(Continued)

*Primary Examiner* — Ping Y Hsieh
(74) *Attorney, Agent, or Firm* — JCIPRNET

(57) ABSTRACT

The invention provides a wafer map identification method, which includes the following steps: obtaining a wafer map of at least one to-be-identified wafer; performing an image processing operation on the wafer map and a reference pattern, wherein the image processing operation includes: performing a convolution operation on the wafer map and the reference pattern respectively, extracting a critical feature of the wafer map after the convolution operation, and calculating a weight distribution based on the reference pattern after the convolution operation; and calculating a similarity between the processed wafer map and the processed reference pattern to identify the wafer map. The invention also provides a computer-readable recording medium recording the above identification method.

9 Claims, 10 Drawing Sheets

(56) References Cited

U.S. PATENT DOCUMENTS

2017/0192411 A1* 7/2017 Ghadar ............ G05B 19/41875
2019/0073566 A1* 3/2019 Brauer ................. G06T 7/0002
2019/0383753 A1* 12/2019 Zhang ................ G01N 23/2251

FOREIGN PATENT DOCUMENTS

WO     2019046141       3/2019
WO     WO2019046141 A1 * 3/2019

OTHER PUBLICATIONS

Fu Chang, et al., "A linear-time component-labeling algorithm using contour tracing technique", Computer Vision and Image Understanding, Feb. 2004, pp. 206-220.

"Office Action of Taiwan Counterpart Application", dated May 18, 2020, p. 1-p. 5.

* cited by examiner

| 0.01 | 0.02 | 0.02 | 0.02 | 0.02 | 0.02 | 0.01 |
| --- | --- | --- | --- | --- | --- | --- |
| 0.02 | 0.03 | 0.03 | 0.03 | 0.03 | 0.03 | 0.02 |
| 0.02 | 0.03 | 0 | 0 | 0 | 0.03 | 0.02 |
| 0.02 | 0.03 | 0 | 0 | 0 | 0.03 | 0.02 |
| 0.02 | 0.03 | 0 | 0 | 0 | 0.03 | 0.02 |
| 0.02 | 0.03 | 0.03 | 0.03 | 0.03 | 0.03 | 0.02 |
| 0.01 | 0.02 | 0.02 | 0.02 | 0.02 | 0.02 | 0.01 |

| 4 | 6 | 6 | 6 | 6 | 6 | 4 |
| --- | --- | --- | --- | --- | --- | --- |
| 6 | 9 | 8 | 8 | 8 | 9 | 6 |
| 6 | 8 | 0 | 0 | 0 | 8 | 6 |
| 6 | 8 | 0 | 0 | 0 | 8 | 6 |
| 6 | 8 | 0 | 0 | 0 | 8 | 6 |
| 6 | 9 | 8 | 8 | 8 | 9 | 6 |
| 4 | 6 | 6 | 6 | 6 | 6 | 4 |

WAFER MAP IDENTIFICATION METHOD AND COMPUTER-READABLE RECORDING MEDIUM

CROSS-REFERENCE TO RELATED APPLICATION

This application claims the priority benefit of Taiwan application no. 108143530, filed on Nov. 29, 2019. The entirety of the above-mentioned patent application is hereby incorporated by reference herein and made a part of this specification.

TECHNICAL FIELD

The invention relates to a wafer map identification technique, and more particularly, to a wafer map identification method and a computer-readable recording medium.

BACKGROUND

In the wafer manufacturing process, the yield rate is often affected by defects that occur due to equipment, environment, and human factors. In order to ensure the yield rate of the product, Chip Probe Test is performed on the wafer and a wafer pattern distribution thereof is analyzed to find the cause of defects to reduce production costs.

An existing analysis method is to compare a wafer map of the wafer, appropriately classify similar wafer pattern distributions, find out process regularity for each classification, and then speculate the most likely process problems for each classification. However, in the conventional classification method, manual comparison is time-consuming and not objective. In the case where a relative position comparison method is used, because a pattern distribution of the wafer map often has problems of incompleteness and noise, an excessive clustering is likely to occur. When predictions are made through modeling, the model may have poor accuracy due to insufficient data amount, and not able to compare a new wafer pattern in real time. Therefore, proposing a wafer map identification method that can be used to reduce comparison time, avoid human error, and improve identification integrity and accuracy has become a problem to be overcome at present.

SUMMARY

The invention provides a wafer map identification method capable of automatically identifying a wafer map and improving identification integrity and accuracy. The invention further provides a computer-readable recording medium recording the above identification method.

An embodiment of the invention provides a wafer map identification method, which includes the following steps: obtaining a wafer map of at least one to-be-identified wafer; performing an image processing operation on the wafer map and a reference pattern, wherein the image processing operation includes: performing a convolution operation on the wafer map and the reference pattern respectively, extracting a critical feature of the wafer map after the convolution operation, and calculating a weight distribution based on the reference pattern after the convolution operation; and calculating a similarity between the processed wafer map and the processed reference pattern to identify the wafer map.

An embodiment of the invention provides a computer-readable recording medium, which records at least one program code, and accesses the at least program code by a processor to execute the identification method described above.

Based on the above, in the wafer map identification method proposed by the invention, because the convolution operation is performed on the wager map and the reference pattern and whether the two are similar is identified by comparing the critical feature of the wafer map after the convolution operation and the reference pattern after the convolution operation, the identification accuracy may be improved. The computer-readable recording medium proposed by the invention records the above wafer map identification method. Accordingly, the computer-readable recording medium may be accessed by a system platform to execute the above identification method, thereby achieving the effect of automatic identification.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 7A to FIG. 7D are schematic diagrams of a generating process of a defect area weight distribution according to another embodiment of the invention.

FIG. 8A to FIG. 8D are schematic diagrams of a generating process of a non-defect area weight distribution according to another embodiment of the invention.

DESCRIPTION OF THE EMBODIMENTS

Figure 1:
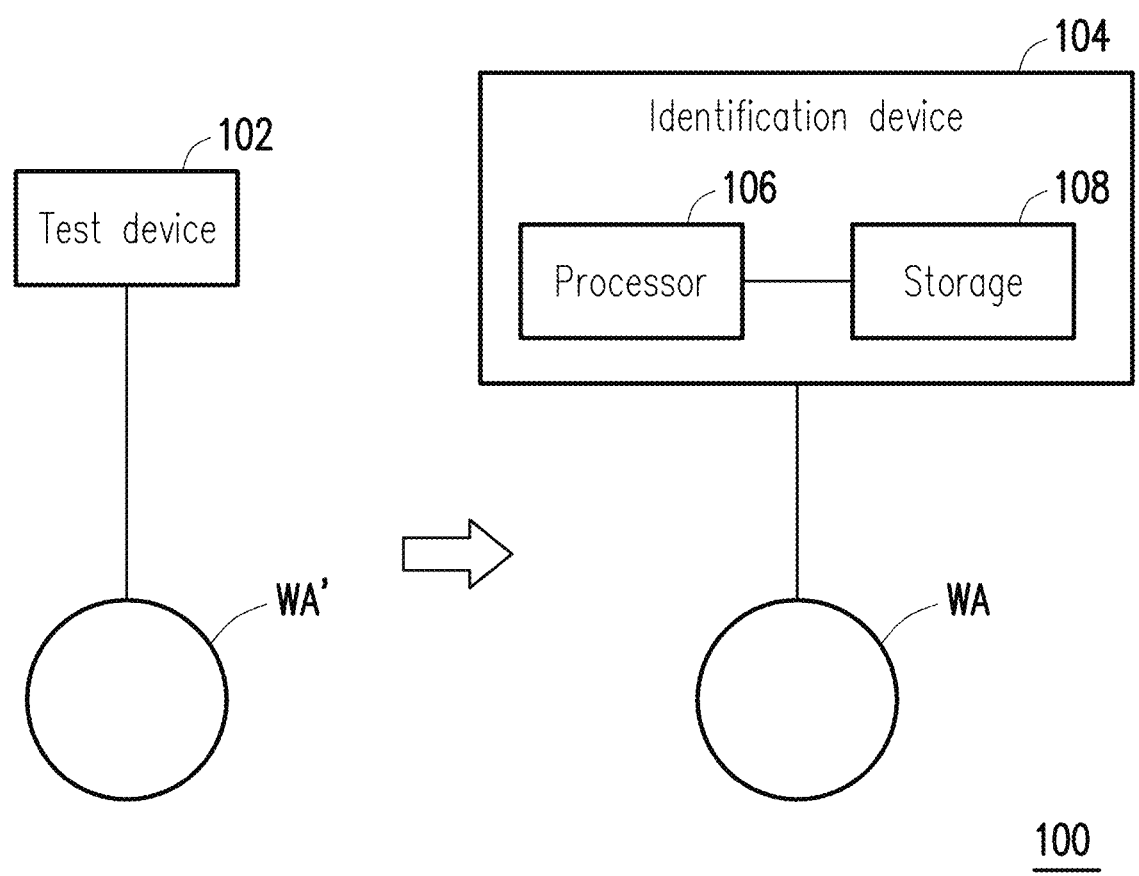
FIG. 1 is a schematic diagram of a wafer identification system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
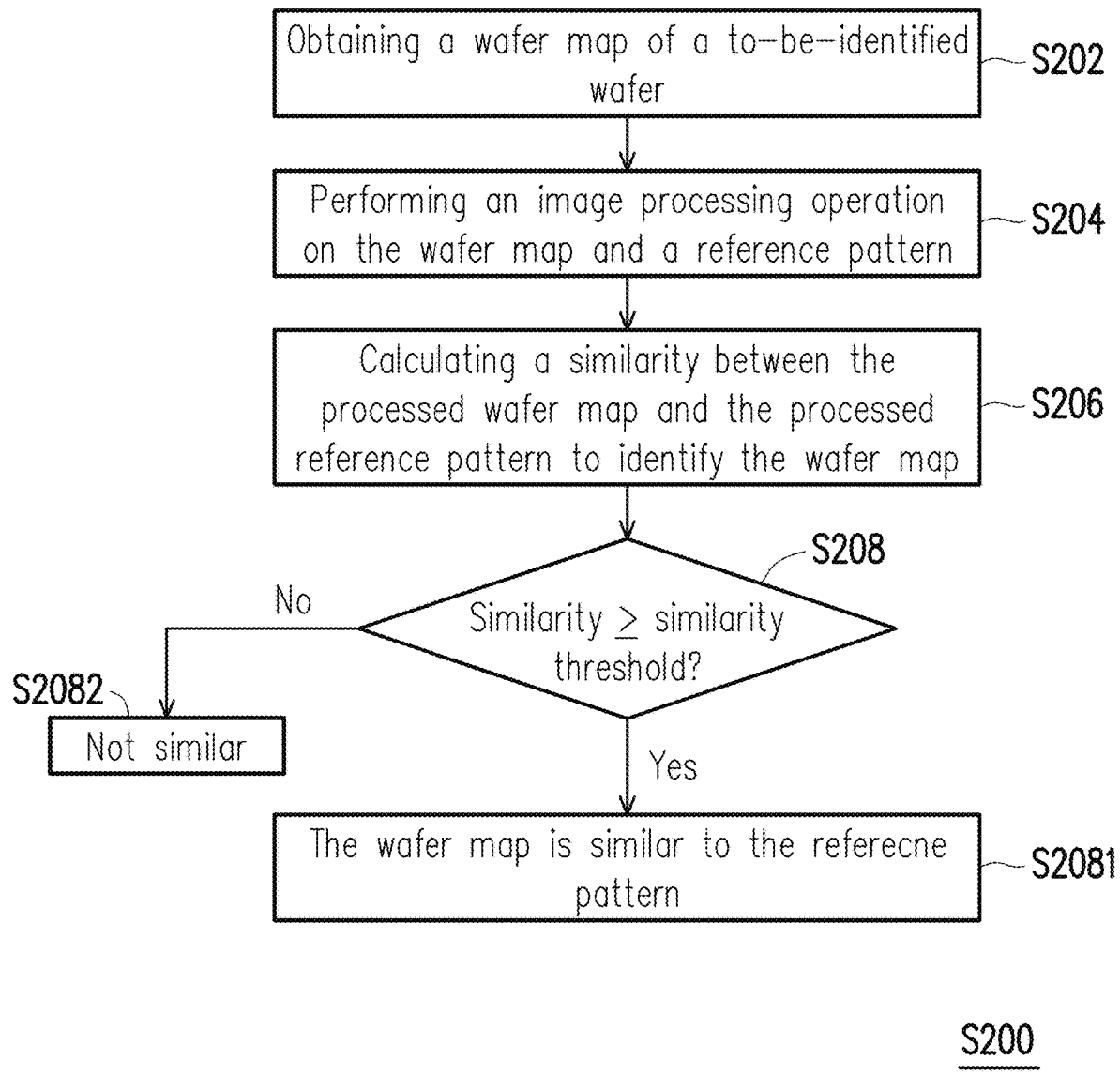
FIG. 2 is a flowchart of a wafer map identification method according to an embodiment of the invention.
Figure 3A:
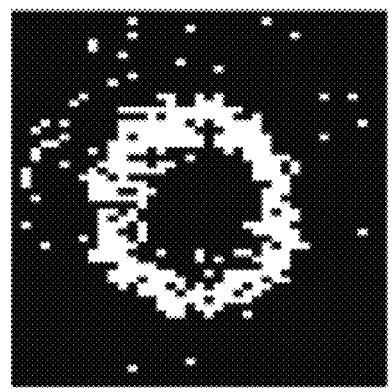
FIG. 3A is a schematic diagram of an original wafer map of a to-be-identified wafer according to an embodiment of the invention.

FIG. 1 is a schematic diagram of a wafer identification system according to an embodiment of the invention; FIG. 2 is a flowchart of a wafer map identification method according to an embodiment of the invention; and FIG. 3A is a schematic diagram of an original wafer map of a to-be-identified wafer according to an embodiment of the invention. Referring to FIG. 1 to FIG. 3A together, a wafer identification system 100 includes a test device 102 and an identification device 104. The test device 102 is, for example, a test machine on production line used to detect a to-be-tested wafer WA' by, for example, performing Chip Probe Testing, but the invention is not limited thereto. After the to-be-tested wafer WA' is detected as a to-be-identified wafer WA by the test device 102, a wafer map of the to-be-identified wafer WA is classified by the identification device 104 according to test data of the test device 102. In this embodiment, a wafer map 300 of FIG. 3A is an original wafer map of the to-be-identified wafer WA, i.e., the test data of the test device 102 obtained by performing chip probing on the to-be-tested wafer WA'.

The identification device 104 is, for example, a system platform in which program codes of the above identification method is embedded to perform the identification process, and a reference pattern database can be stored. The wafer map and the reference pattern are compared by the identification device 104. If the wafer map and the reference pattern are similar, they are classified into the same classification, which indicates that the wafer may encounter the same process problem. Specifically, the identification device 104 is, for example, a machine or a server, and includes a processor 106 and a storage 108 electrically connected to the processor 106. The processor 106 is, for example, a central processing unit (CPU), a programmable microprocessor, an embedded control chip or the like. The storage 108 is a computer-readable recording medium, such as a CD, a fixed or a movable device in any possible forms including a random access memory (RAM), a read-only memory (ROM), a flash memory, a hard drive or other similar devices, or a combination of the above devices. The store 108 records at least one program code. The program code is accessed by the processor 106 to execute an identification method 200 for the wafer map of FIG. 2. In addition, the storage 108 may also store the reference pattern database, which records multiple reference patterns corresponding to fail bit distributions caused by various process problems. The processor 106 executes the identification method 200 to compare whether a wafer map 300 of the to-be-identified wafer WA is similar to the reference pattern in the storage 108. If they are similar, it indicates that the to-be-identified wafer WA may encounter the same process problem.

The implementation details of the identification method 200 are further described below.

In step S202, the identification device 104 obtains a wafer map of at least one to-be-identified wafer. In this embodiment, the identification device 104 obtains the wafer map 300 of the to-be-identified wafer WA from the test device 102. In the wafer map 300, two values "1" and "0" are respectively used to represent a fail bit and a normal bit, but not limited thereto. A coordinate of the fail bit of the to-be-identified wafer WA in the wafer map 300 is represented by the value "1" (represented here by white), and a coordinate of the normal bit in the wafer map 300 is represented by the value "0" (represented here by a black).

Figure 4B:
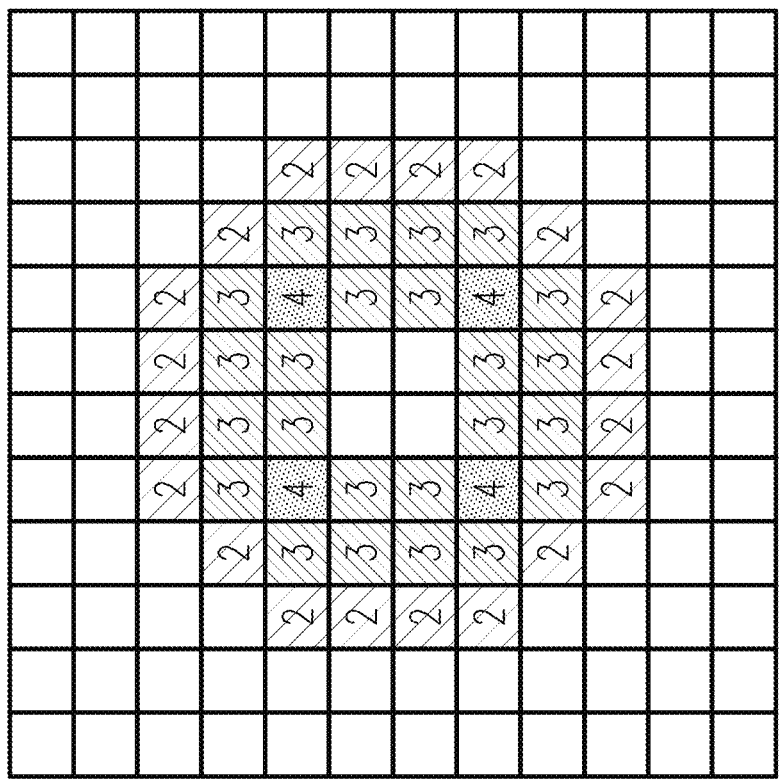
FIG. 4B is a schematic diagram of a result of the image processing performed on the reference pattern of FIG. 4A.
Figure 4A:
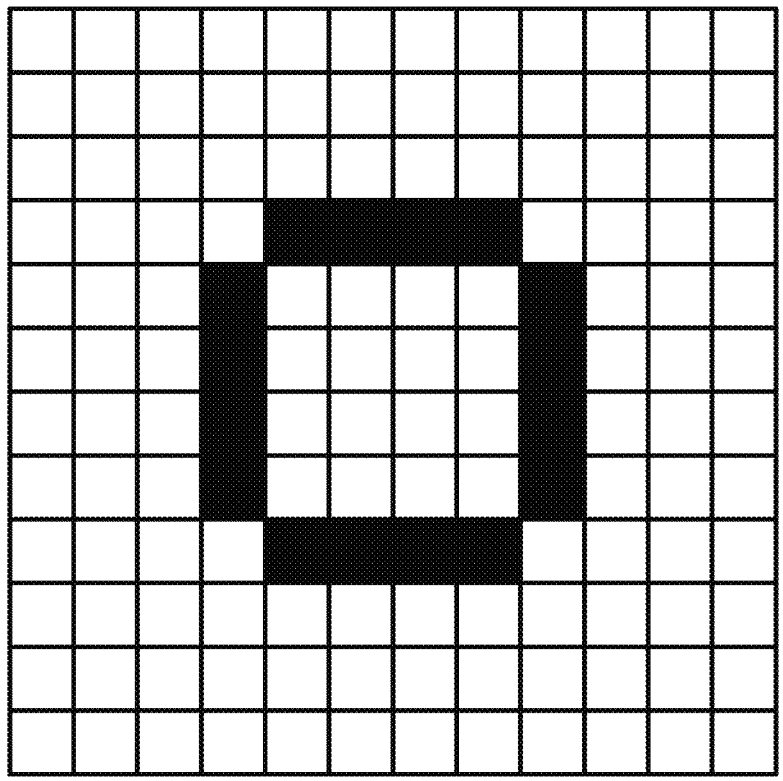
FIG. 4A is a schematic diagram of a reference pattern according to an embodiment of the invention.

FIG. 4A is a schematic diagram of a reference pattern according to an embodiment of the invention. Referring to FIG. 4A, in a reference pattern 400, black areas represent a distribution feature of the fail bits, which are represented by the value "1", and white areas are represented by the value "0".

Figure 3B:
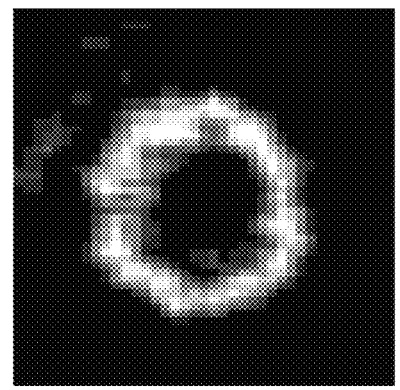
FIG. 3B to FIG. 3C are schematic diagrams of an image processing process of the wafer map of FIG. 3A.
Figure 3C:
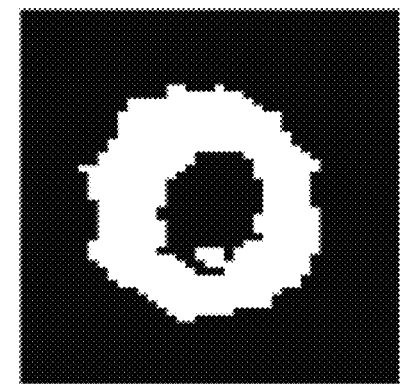
Figure 5:
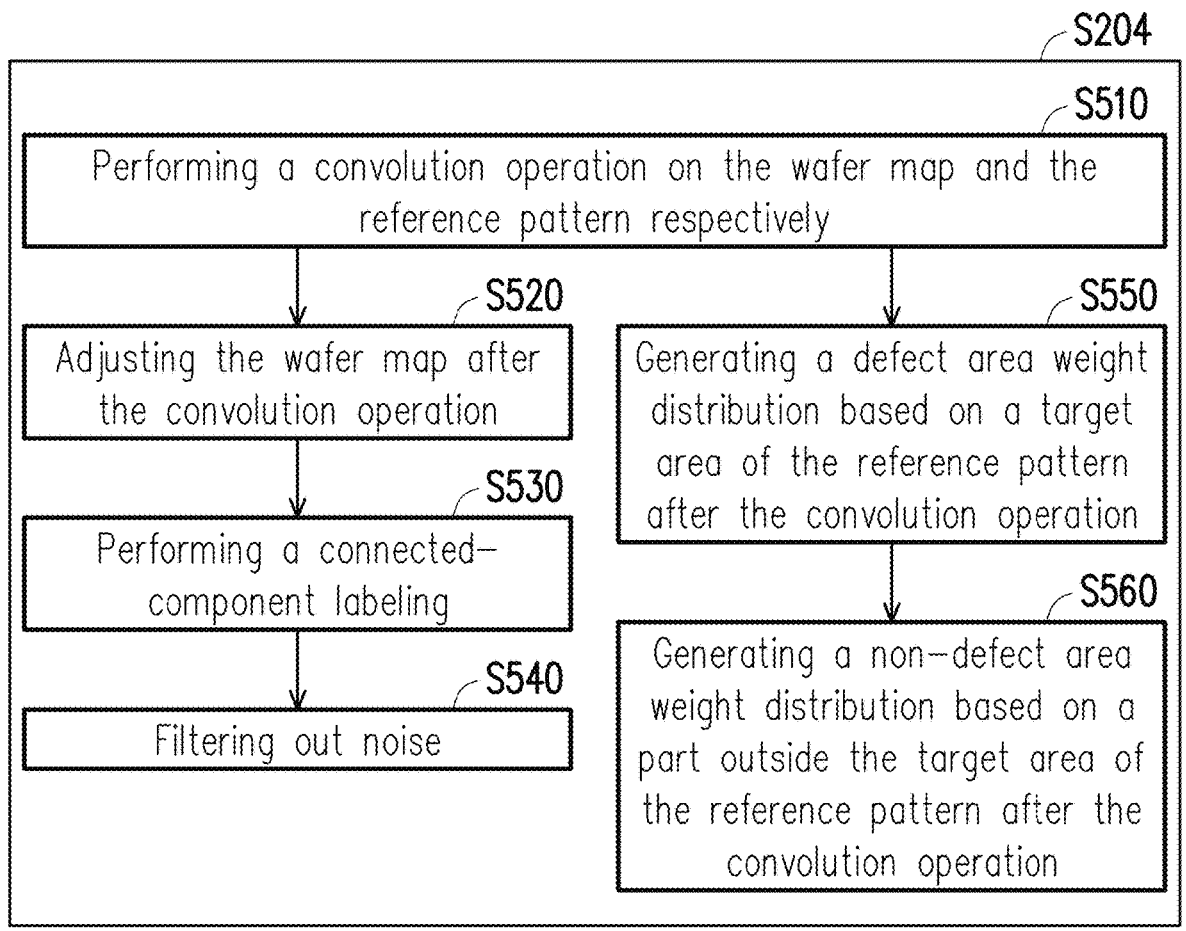
FIG. 5 is a flowchart of an image processing operation according to an embodiment of the invention.

In step S204, the identification device 104 performs an image processing operation on each of the wafer map 300 and the reference pattern 400. Specific implementation of step S204 are described below with reference to FIG. 3B to FIG. 5. FIG. 3B to FIG. 3C are schematic diagrams of an image processing process of the wafer map 300 of FIG. 3A; FIG. 4B is a schematic diagram of a result of the image processing performed on the reference pattern 400 of FIG. 4A; and FIG. 5 is a flowchart of an image processing operation according to an embodiment of the invention. In the embodiment of FIG. 5, the image processing operation includes: performing a convolution operation on the wafer map and the reference pattern respectively, extracting a critical feature of the wafer map after the convolution operation, and calculating a weight distribution based on the reference pattern after the convolution operation.

In step S510, the convolution operation is performed on the wafer map 300 and the reference pattern 400 respectively. In this embodiment, a convolution kernel of the convolution operation is, for example, a 3×3 matrix of ones. A wafer map 310 of FIG. 3B and a reference pattern 410 of FIG. 4B respectively show results of the embodiment of FIG. 3A and FIG. 4A after the convolution operation.

Next, in step S520, the wafer map 310 after the convolution operation is adjusted. In an embodiment, when the convolution result of one specific coordinate of the wafer map 300 is greater than a reference value, the identification device 104 changes a value of that coordinate. Implementation of step S520 is described below with reference to the embodiment of FIG. 6.

Figure 6:
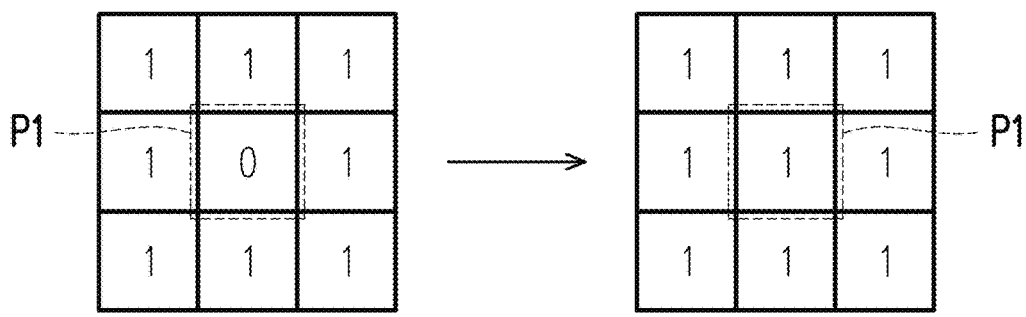
FIG. 6 is a schematic diagram for adjusting a convolution result of the wafer map according to an embodiment of the invention.

FIG. 6 is a schematic diagram for adjusting a convolution result of the wafer map according to an embodiment of the invention. Referring to FIG. 6, in this embodiment, a value of one specific coordinate P1 of the wafer map 300 is "0", and values of the surrounding coordinates are "1". The result of the convolution operation performed on the coordinate P1 with the convolution kernel of the 3×3 matrix of ones is 8, which is greater than the reference value of this embodiment (e.g., set to 1). Therefore, in step S510, the value of the coordinate P1 is changed from "0" to "1" for subsequent steps to use.

Next, in step S530 and step S540, a connected-component labeling is performed on the wafer map after the convolution operation and the adjustment, pattern features are turned into blocks (e.g., fail areas are turned into blocks in FIG. 3B), and an area ratio of each area is calculated so as to extract the critical feature of the wafer map as shown in FIG. 3C and filter out a noise. Here, the critical feature of the wafer map refers to a distribution pattern of critical fail bits of the wafer map. In an embodiment, the critical feature is extracted and the noise of the wafer map 300 is filtered out according to a labeling result together with Pareto Analysis method. FIG. 3C shows a result of the embodiment of FIG. 3B after step S530 and step S540. Referring to FIG. 3C, a wafer map 320 is a result of the wafer map 300 after step S204. Compared to the original wafer map 300, the wafer map 320 is more complete with the reduced noise, and keeps the distribution feature of the critical fail bits. In short, the wafer map 320 after the image processing shows the critical feature of the wafer map 300 with noise interference filtered out, which is helpful to improve accuracy of comparison with the reference pattern.

In step S550 and step S560, a defect area weight distribution and a non-defect area weight distribution are generated based on the reference pattern after the convolution operation. The weight distribution described above includes the defect area weight distribution and the non-defect area weight distribution.

Specifically, in step S550, the defect area weight distribution is generated based on a target area of the reference pattern after the convolution operation. Then, in step S560, the non-defect area weight distribution is generated based on a part outside the target area of the reference pattern after the convolution operation, wherein the target area reflects a fail bit area of the reference pattern.

Figures 7A, 7B:
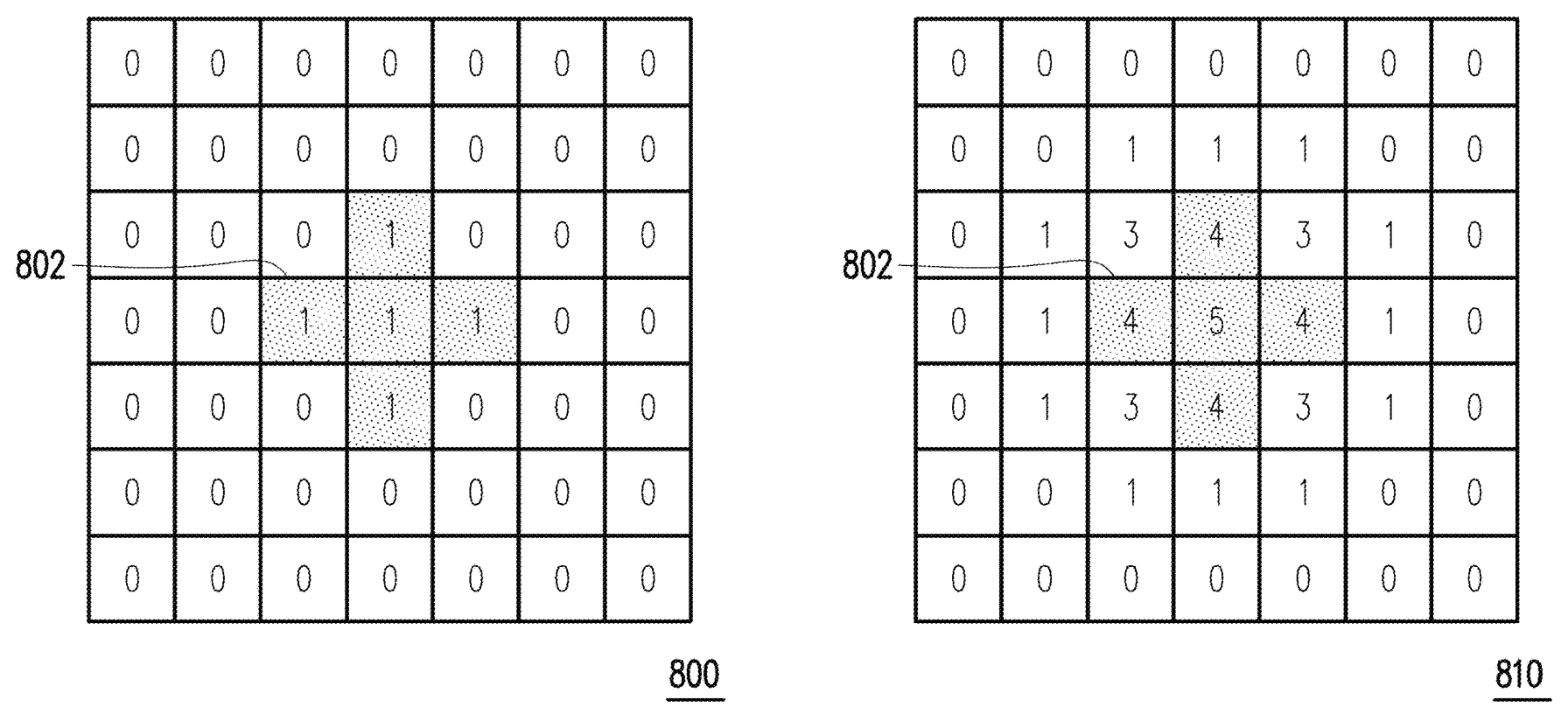
Figures 7C, 7D:
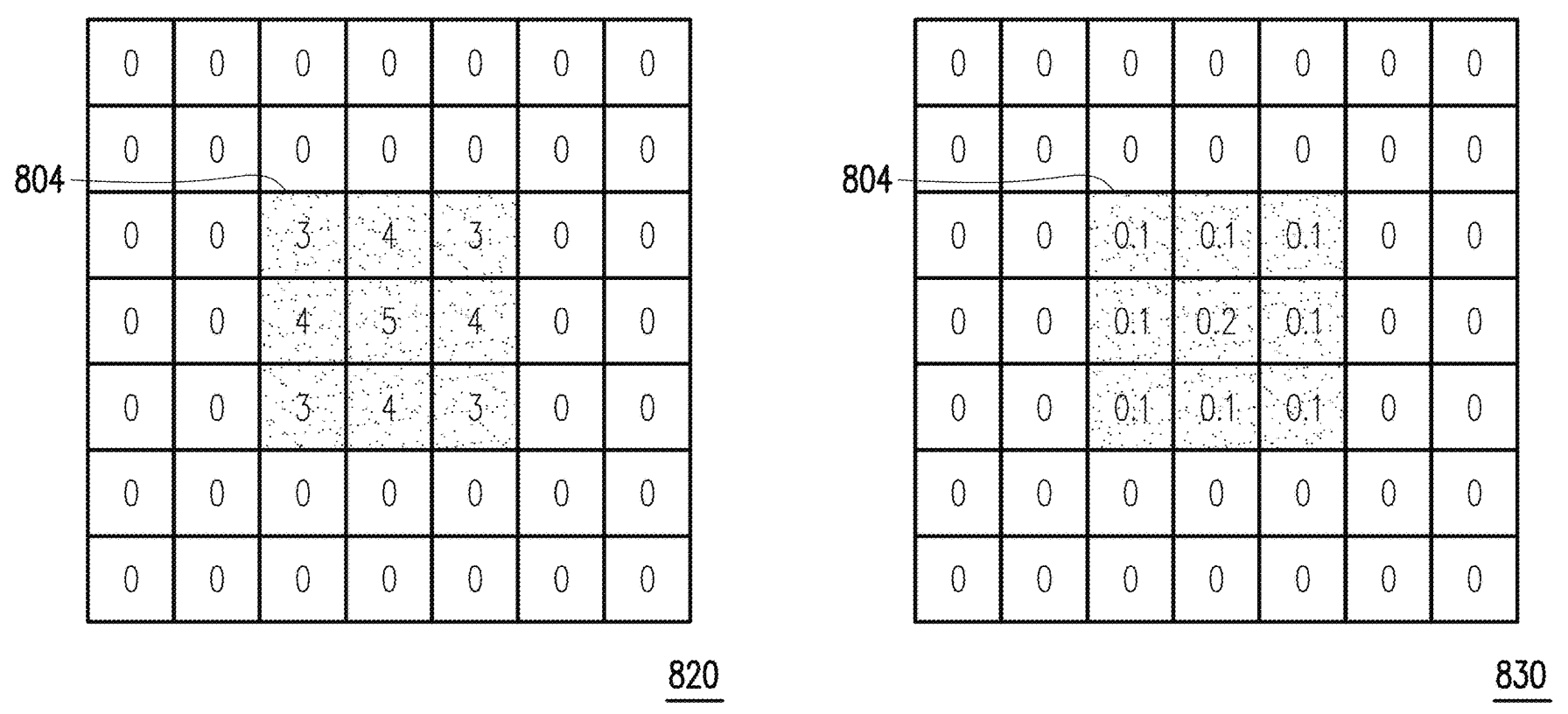

FIG. 7A to FIG. 7D are schematic diagrams of a generating process of a defect area weight distribution according to another embodiment of the invention. Referring to FIG. 7A to FIG. 7D together, in a reference pattern 800, an area 802 including the coordinates with the value of "1" represent a distribution pattern of the fail bits, and the coordinates with the value of "0" represent the normal bits. The identification device 104 performs the convolution operation on the reference pattern 800 to obtain a convolution result 810 of FIG. 7B. The convolution result 810 highlights a distribution status of the fail bits of the reference pattern 800. Next, the noise of the convolution result 810 is filtered out so a result 820 of FIG. 7C is obtained. For example, values outside a target area 804 are deleted (set to 0), and only values within the target area 804 are kept as the result 820 after filtering out. The target area 804 is determined according to a distribution of the convolution result 810, such as more obvious parts of the area 802 after the convolution operation (e.g., parts with the value greater than 1). In another embodiment, the target area 804 may be determined according to the area 802 representing the fail bit pattern, and the invention does not limit the manner of determining the target area 804. Lastly, the identification device 104 performs normalization on the result 820, and obtains a defect area weight distribution 830 of the reference pattern 800.

Figures 8A, 8B:
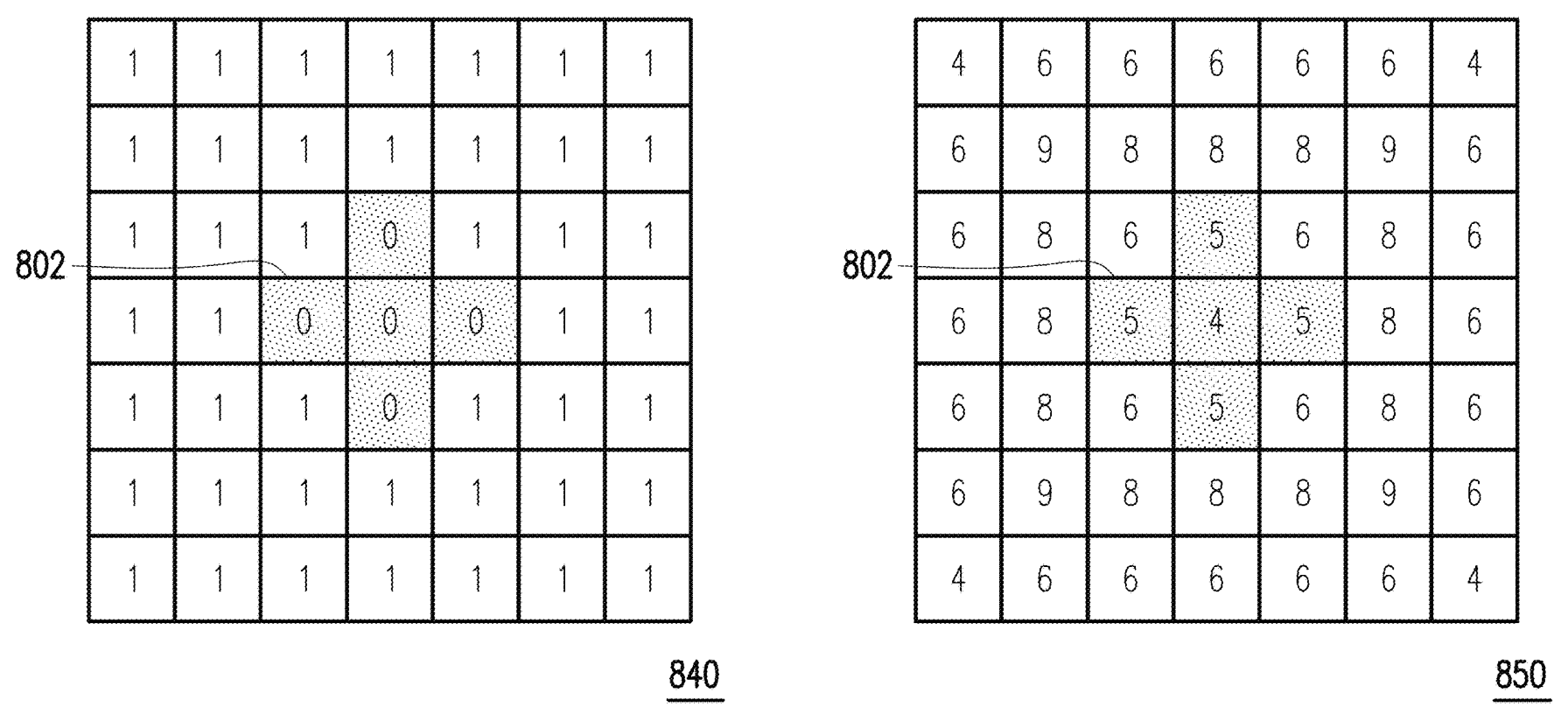

FIG. 8A to FIG. 8D are schematic diagrams of a generating process of a non-defect area weight distribution according to another embodiment of the invention. Referring to FIG. 8A to FIG. 8D together, the identification device 104 first exchanges "1" and "0" in the reference pattern 800 to obtain a complementary reference pattern 840. At this time, the coordinates with the value "1" in the complementary reference pattern 840 represent non-defect bits, and the coordinates with the value "0" represent defect bits (the value in the area 802 becomes "0"). Next, a distribution status of defect positions of the complementary reference pattern 840 is highlighted by the convolution operation so a convolution result 850 of FIG. 8B is obtained. Next, because positions of the fail bits of the reference pattern 800 and the complementary reference pattern 840 are disjoint sets, all values outside the target area 804 in FIG. 8B are deleted (returned to 0). In other words, for the coordinates with the value greater than 0 in FIG. 7C, the value is set to "0" in FIG. 8C. Lastly, the result 860 of FIG. 8C is normalized so a non-defect area weight allocation 870 is obtained.

In particular, the numbers in FIG. 7D and FIG. 8D are for illustration only instead of representing actual numbers, and yet a sum of the values in FIG. 7D and FIG. 8D is actually equal to 1.

Next, step S206 is executed to calculate a similarity between the processed wafer map 320 and the processed reference pattern 410 to identify the wafer map 300.

The identification device 104 first determines a weighted value W, wherein the weighted value W is a fail ratio of the to-be-identified wafer WA, a maximum value of the weighted value W is less than 1, and a minimum value of the weighted value W is greater than 0. In this embodiment, the weighted value W falls within a range from 0.8 to 0.2. That is to say, the weighted value W is set to 0.8 when the fail ratio of the to-be-identified wafer WA is greater than 0.8, or the weighted value W is set to 0.2 when the fail ratio is less than 0.2.

Next, the identification device 104 calculates a sum value (a.k.a. a first sum value) of positions in the defect area weight distribution corresponding to fail bits of the processed wafer map 320, and multiplies the first sum value by the weighted value W to obtain a fail bit similarity. Further, the identification device 104 calculates a sum value (a.k.a. a second sum value) of positions in the non-defect area weight distribution corresponding to fail bits of the processed wafer map 320, and multiplies the second sum value by (1−W) to obtain a normal bit similarity. Lastly, the identification device 104 sums up the fail bit similarity and the normal bit similarity as a similarity between the wafer map 300 and the reference pattern 400.

Specifically, each bit value of the wafer map 320 is $X_i$; $X_i=0$ or 1; i is a positive integer from 0 to N; and N is a total number of bits of the wafer map 320. If each weight of the defect area weight distribution is $Y_i$ where $0 \leq Y_i < 1$ and each weight of the non-defect area weight distribution is $Z_i$ where $0 \leq Z_i < 1$, a similarity A between the wafer map 300 and the reference pattern 400 may be expressed by the following equation:

$$A = \sum_{i=1}^{i=N} (X_i \times Y_i \times W) + ((1 - X_i) \times Z_i \times (1 - W))$$

In other words, if the fail bit of the wafer map 320 falls on the bit with the value greater than 0 in the detect area weight distribution (e.g., within the target area 804 of FIG. 7D), the identification device 104 can obtain the weight of the fail bit at the corresponding position in the defect area weight distribution, and multiply the weight by the weighted value W. If the coordinate with the value greater than 0 in the defect area weight distribution is the normal bit at the corresponding position of the wafer map 320, the identification device 104 does not accumulate the weight. After all the weights in the defect area weight distribution corresponding to the fail bits of the wafer map 320 are accumulated and multiplied by the weighted value W, the identification device 104 can obtain the fail bit similarity. If the normal bit of the wafer map 320 falls on the position with the value greater than 0 in the non-detect area weight distribution (e.g., outside the target area 804 of FIG. 8D), the weight of the normal bit at the corresponding position in the non-defect area weight distribution may be obtained and multiplied by (1−W). If the coordinate with the value greater than 0 in the defect area weight distribution is the fail bit at the corresponding position of the wafer map 320, the identification device 104 does not accumulate the weight. After all the weights in the non-defect area weight distribution corresponding to the normal bits of the wafer map 320 are accumulated and multiplied by (1−W), the identification device 104 can obtain the normal bit similarity. Lastly, the fail bit similarity and the normal bit similarity are summed up as a similarity between the wafer map 320 and the reference pattern 400.

Then, in step S208, whether the similarity is greater than or equal to a similarity threshold is determined, wherein the similarity threshold is greater than the maximum value 0.8 of the weighted value W. For example, in the above embodiment, the similarity threshold is 0.85. If the similarity is greater than or equal to the similarity threshold, it is determined that the wafer map 320 is similar to the reference pattern 400, and the process proceeds to step S2081. Otherwise, if the similarity is less than the similarity threshold, the process proceeds to step 2082 in which it is determined that the wafer map 320 is not similar to the reference pattern 400.

Figure 9:
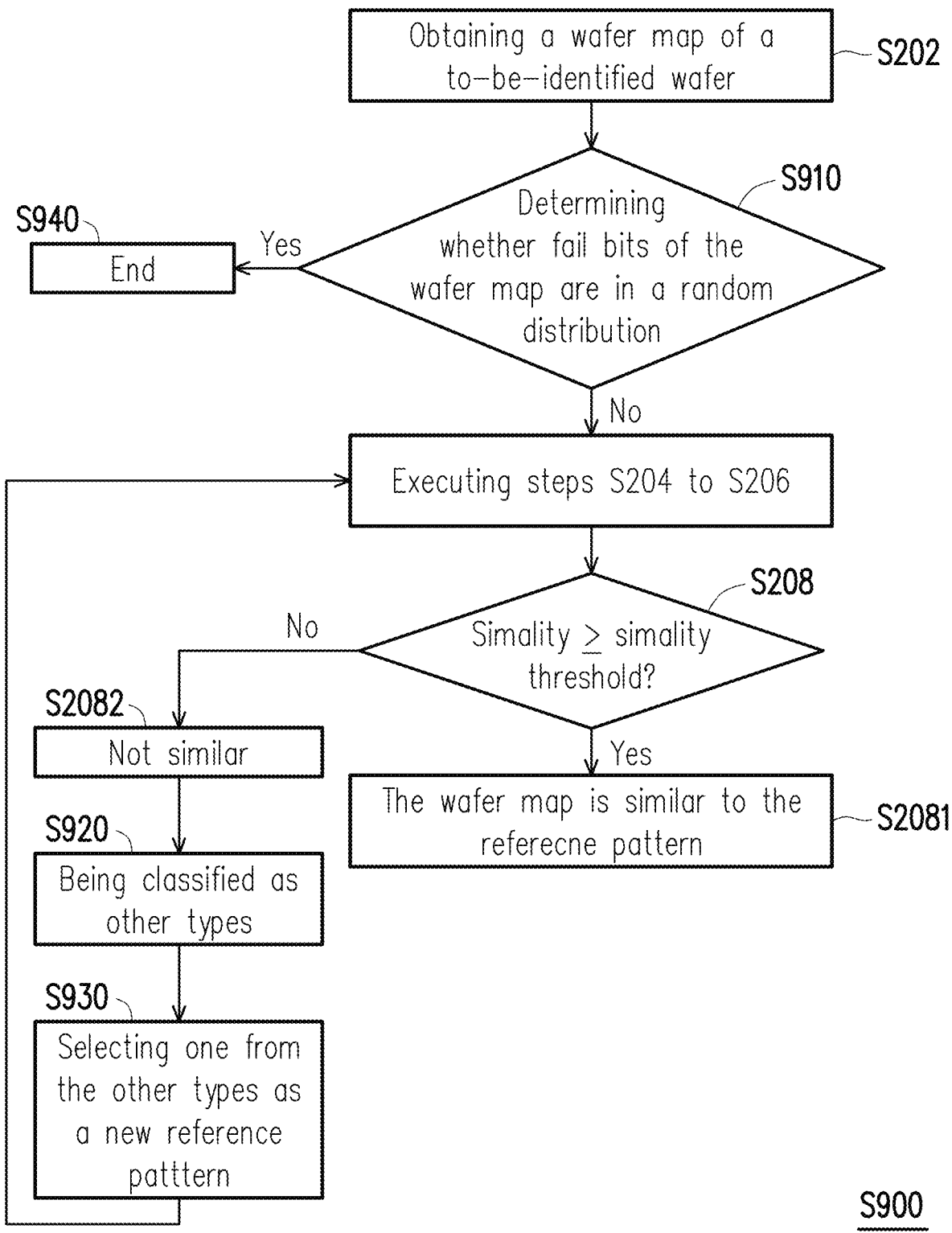
FIG. 9 is a flowchart of a wafer map identification method according to another embodiment of the invention.

FIG. 9 is a flowchart of a wafer map identification method according to another embodiment of the invention. Referring to FIG. 9, in an identification method S900, a wafer identification system identifies a plurality of to-be-identified wafers WA. In step S202, the identification device 104 obtains wafer maps of the to-be-identified wafers. In step S910, for each of the to-be-identified wafers WA, the identification device 104 determines whether fail bits of the wafer map are in a random distribution to determine whether to compare the reference pattern and the wafer map. If the wafer map belongs to a random distribution type, the identification operation is ended (step S940).

When it is determined that the current wafer map does not belong to the random distribution type, the above steps S204 to S208 are then performed. In step S208, the current wafer map is identified according to the similarity between the wafer map and the reference pattern. If the similarity is greater than or equal to the similarity threshold, the process proceeds to step S2081 to identify the wafer map. If the similarity is less than the similarity threshold, the process proceeds to step S2082 and step S920, in which the wafer map is determined as not being similar to existing reference pattern(s) (which can be a specific reference pattern or all the reference patterns in the reference pattern database), and the wafer map not belonging to the random distribution type and unidentifiable is then classified as other types. Then, in step S930, one having a maximum fail ratio is selected from the unidentifiable wafer maps (classified as the other types) as a new reference pattern.

Then, step S204 to step S208 are re-executed to identify whether the remaining wafer maps in the other types are similar to the new reference pattern selected in step S930. In this embodiment, the wafer maps may be selected sequentially as the new reference pattern according to a size of the fail ratio, so as to compare whether any of the remaining unidentifiable wafer maps is similar to the current new reference pattern for further classification. The above method is repeated until all the wafer maps in other type are identified.

In this embodiment, the identification device can first conduct comparison and identification with all the patterns from the reference pattern database, and then select the wafer map with greater fail ratio from the remaining unidentifiable wafer maps as the new reference pattern to be stored to the reference pattern database. In this way, the reference pattern can be updated in real time during the identification process to avoid the problem of incomplete pattern database.

In this embodiment, the processor 106 can access the program codes in the storage 108 to execute an artificial intelligence model to automatically train the incomplete pattern database. For example, the reference pattern database in the storage 108 is improved during the identification process by means of machine learning (Supervised Machine Learning). The processor 106 can execute the artificial intelligence model to implement the above embodiment to achieve the effect of automatically identifying the to-be-identified wafer 300. Also, if the new reference pattern appears in the identification process, the identification device 104 can automatically update the reference pattern database in real time to avoid the problem of the incomplete reference pattern database.

In summary, the embodiments of the invention propose a wafer map identification method, in which the convolution operation is performed on the wafer map such that the purpose of complete defect area and removal of image noise may achieved to improve identification accuracy. By performing the convolution operation on the reference pattern to highlight the distribution status of the defect area and the non-defect area of the reference pattern, a proper weight distribution may be obtained. When calculating the similarity between the wafer map and the reference pattern, the identification method proposed by an embodiment of the invention not only considers contribution of the similarity from the defect area, but also considers contribution of the similarity from the non-defect area. In this way, the similarities of the wafer map in the defect area and the non-defect area of the reference pattern can be reflected at the same time. In addition, in an embodiment, if the wafer map of a non-random distribution type cannot be classified by the current reference pattern database, the identification method of the invention can also update and record such wafer map in the reference pattern database. Especially, when there are multiple unidentifiable wafer maps, the identification method of the invention can select the one having the maximum fail ratio as the reference pattern to be updated to the reference pattern database. With this ability to actively update the reference pattern database, the identification method of the invention can avoid the problem of incomplete file creation of the reference pattern database, and can complete the classification of the wafer maps in real time during the identification process. An embodiment of the invention further provides the computer-readable recording medium recording the above wafer map identification method, and a system platform can load in the program code stored in the computer-readable recording medium to execute the identification method.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wafer map identification method, comprising:
   obtaining a wafer map of at least one to-be-identified wafer;
   performing an image processing operation on the wafer map and a reference pattern, wherein the image processing operation comprise:
   performing a convolution operation on the wafer map and the reference pattern respectively, extracting a critical feature of the wafer map after the convolution operation, and calculating a weight distribution based on the reference pattern after the convolution operation; and
   calculating a similarity between the processed wafer map and the processed reference pattern to identify the wafer map,
   the identification method further comprises:
   when the at least one to-be-identified wafer are a plurality of to-be-identified wafers and at least part of wafer maps of the to-be-identified wafers are unidentifiable and are not belonging to a random distribution type, selecting one of the unidentifiable wafer maps having a maximum fail ratio as a new reference pattern; and
   comparing a similarity between the new reference pattern and the remaining unidentifiable wafer maps.

2. The identification method of claim 1, wherein the image processing operation further comprises:
   performing a connected-component labeling on the wafer map after the convolution operation and an adjustment to extract the critical feature of the wafer map and filter out a noise.

3. The identification method of claim 1, wherein the step of calculating the weight distribution based on the reference pattern after the convolution operation comprises:
   generating a defect area weight distribution based on a target area of the reference pattern after the convolution operation; and
   generating a non-defect area weight distribution based on a part outside the target area of the reference pattern after the convolution operation, wherein the weight distribution comprises the defect area weight distribution and the non-defect area weight distribution.

4. The identification method of claim 3, wherein the step of calculating the similarity between the processed wafer map and the processed reference pattern to identify the wafer map comprises:
   determining a weighted value W; and
   calculating a first sum value of positions in the defect area weight distribution corresponding to fail bits of the processed wafer map, and multiplying the first sum value by the weighted value W to obtain a fail bit similarity;
   calculating a second sum value of positions in the non-defect area weight distribution corresponding to normal bits of the processed wafer map, and multiplying the second sum value by (1-W) to obtain a normal bit similarity; and
   summing up the fail bit similarity and the normal bit similarity to obtain the similarity between the wafer map and the reference pattern.

5. The identification method of claim 4, wherein the weighted value W is a fail ratio of the to-be-identified wafer, a maximum value of the weighted value W is less than 1, and a minimum value of the weighted value W is greater than 0.

6. The identification method of claim 4, wherein the step of calculating the similarity to identify the wafer map comprises:
   when the similarity is greater than or equal to a similarity threshold, determining that the wafer map is similar to the reference pattern, wherein the similarity threshold is greater than the weighted value W.

7. The identification method of claim 1, further comprising:
   determining whether fail bits of the wafer map are in a random distribution to determine whether to compare the reference pattern and the wafer map.

8. The identification method of claim 1, further comprising:
   executing an artificial intelligence model to automatically train a reference pattern database, wherein when the new reference pattern appears, the new reference pattern is updated to the reference pattern database.

9. A non-transitory computer-readable recording medium, recording at least one program code, and accessing the at least program code by a processor to execute the identification method of claim 1.

* * * * *